March 24, 1942.    E. T. JOHNSON ET AL    2,277,591
CORN HARVESTER
Filed Aug. 29, 1940    3 Sheets-Sheet 2

INVENTOR:
ELLSWORTH T. JOHNSON
NORMAN F. ANDREWS
BY
ATTORNEYS.

March 24, 1942.    E. T. JOHNSON ET AL    2,277,591
CORN HARVESTER
Filed Aug. 29, 1940    3 Sheets-Sheet 3

INVENTOR:
ELLSWORTH T. JOHNSON
NORMAN F. ANDREWS
BY
ATTORNEYS.

Patented Mar. 24, 1942

2,277,591

UNITED STATES PATENT OFFICE 2,277,591

CORN HARVESTER

Ellsworth T. Johnson and Norman F. Andrews, Moline, Ill., assignors to Deere & Company, Moline, Ill., a corporation of Illinois Application August 29, 1940, Serial No. 354,662

2 Claims. (Cl. 130—5)

The present invention relates generally to corn harvesters and more particularly to cleaning and husking mechanism therefor, and has as its principal object the provision of cleaning and husking mechanism for corn harvesters which is simple and compact but at the same time provides for maximum accessibility to the working mechanism thereof. This invention is in the nature of an improvement in the corn harvester shown and described in a co-pending application, Serial No. 250,516, filed January 12, 1939, by Coultas and Colvin. In this type of corn harvester the snapped ears are conveyed rearwardly by means of an elevator and discharged into a transverse trough, which feeds them into a set of transversely disposed husking rolls over which is mounted a flexible endless type ear retarder. A cleaning fan is mounted over the ear retarder for directing a blast of cleaning air into the trough to clean the dirt and loose leaves from the ears of corn before they enter the husking rolls. As will be understood by those skilled in the art, this is a particularly efficient and compact arrangement, but heretofore the compactness has been obtained with some sacrifice in accessibility. Under certain harvesting conditions it is desirable to frequently inspect and clean out husks and silks from the husking rolls, and to change the number and location of the husking pegs in the rolls, making it highly desirable to easily and quickly obtain access to the husking rolls. Accordingly, it is a further and more specific object of the present invention to provide corn husking and cleaning mechanism not only efficient and compact but which provides for maximum accessibility of the husking rolls and other working parts.

Figure 1:
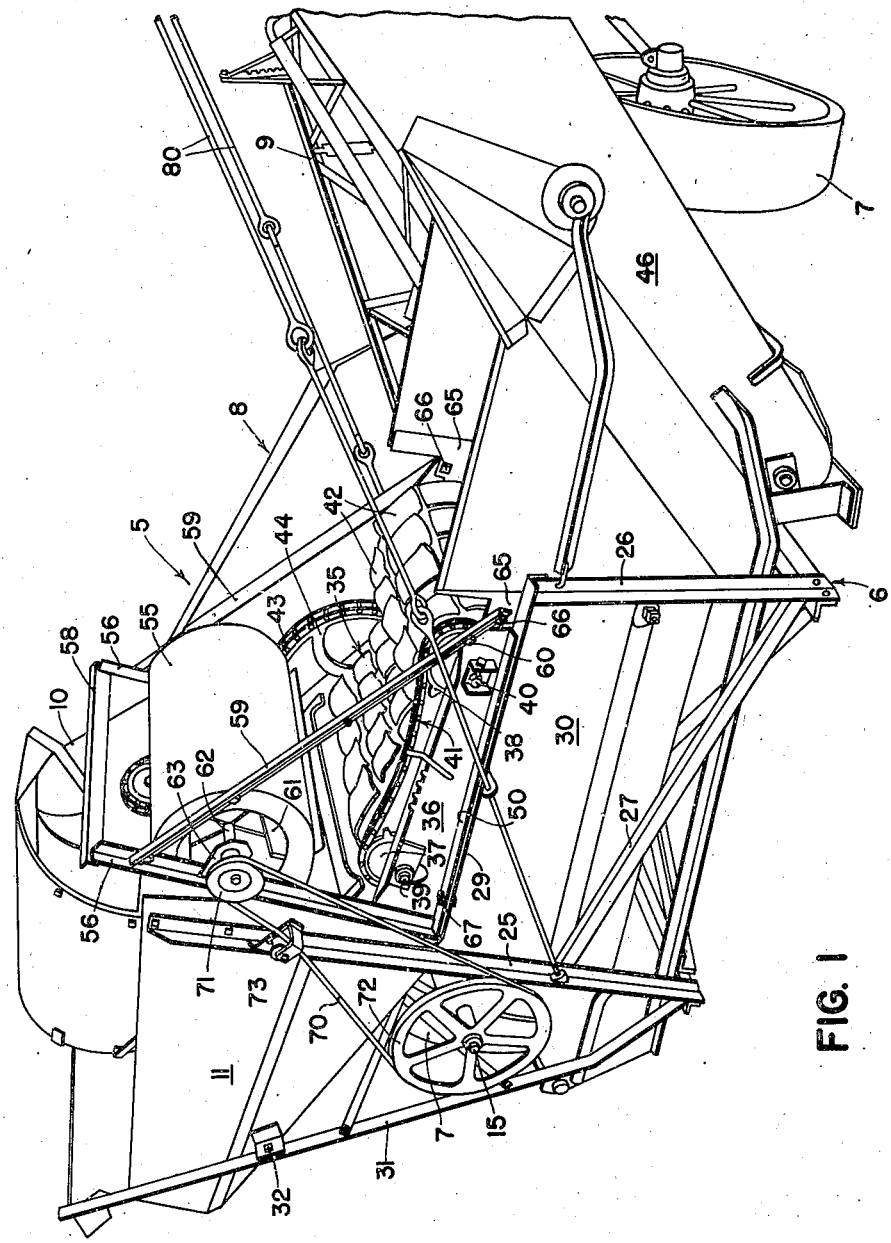
Figure 2:
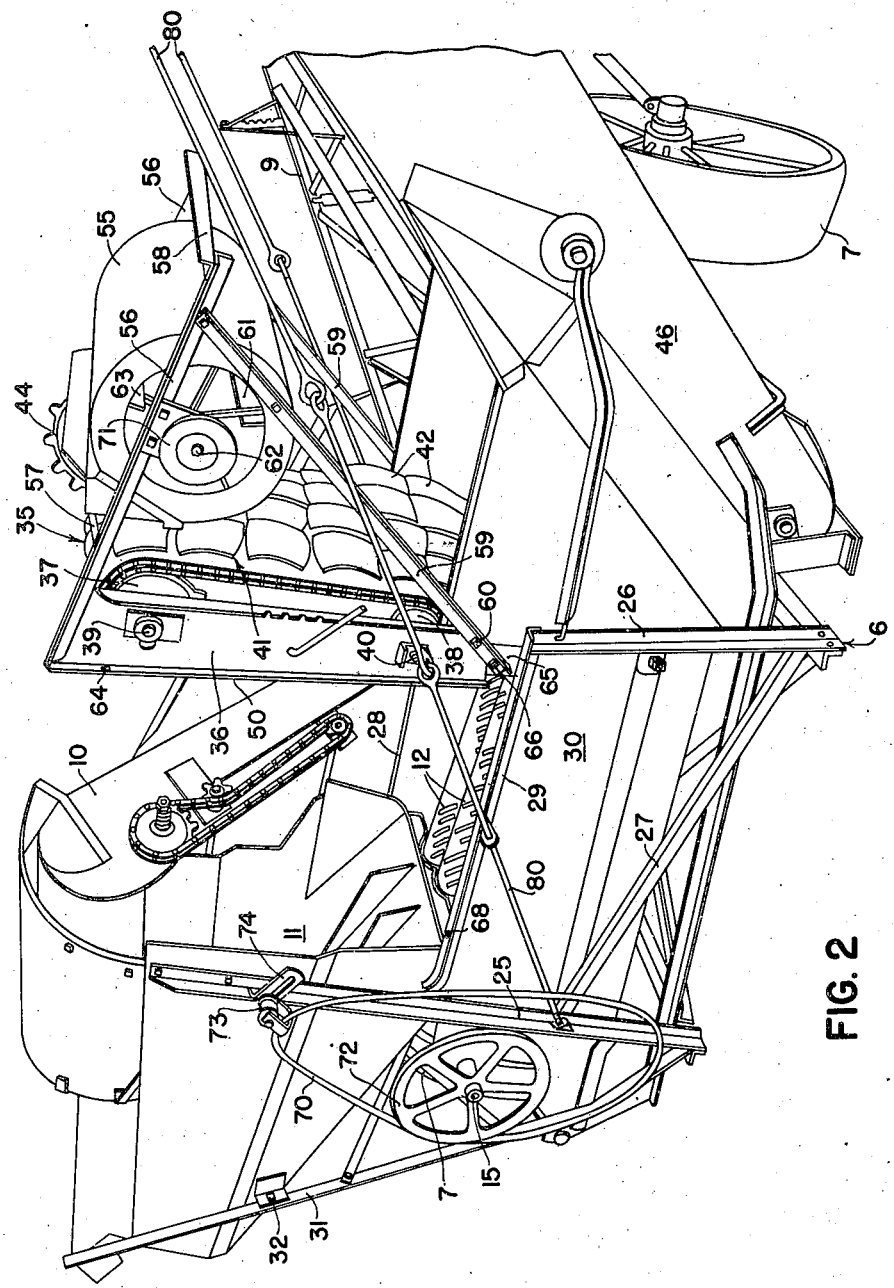
Figure 3:
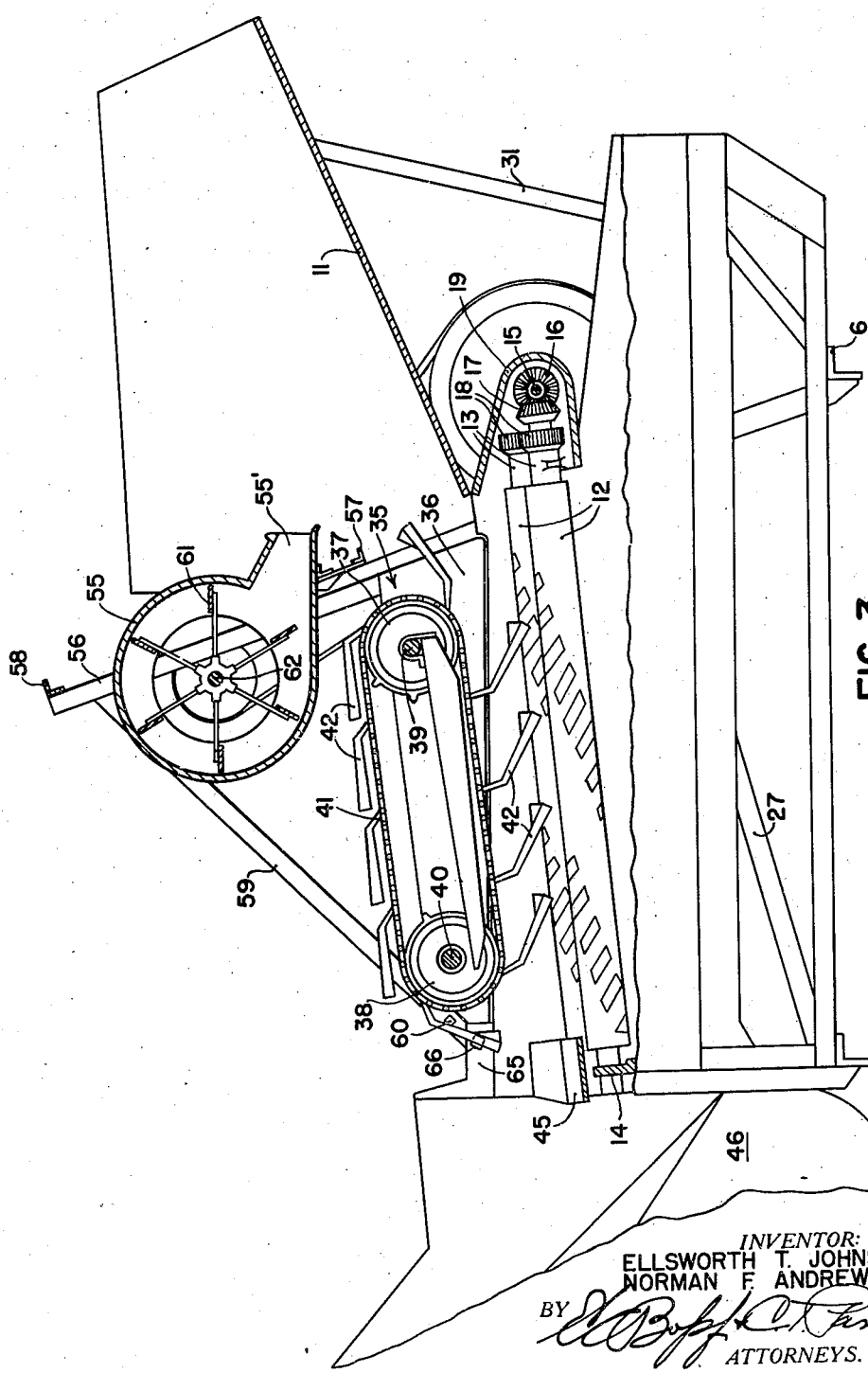

These and other objects and advantages of the present invention will be apparent after a consideration of the following description, in which reference is had to the drawings appended hereto, in which Figure 1 is a perspective view of the rear of a corn harvester showing the cleaning and husking mechanism in normal operating position;

Figure 2 is a similar view showing the ear retarder and cleaning fan swung away from the husking rolls to permit inspection and cleaning of the latter; and Figure 3 is a sectional elevational view, drawn to an enlarged scale, of the husking and cleaning mechanism, as viewed rearwardly from a position in front of the machine.

Referring now to the drawings, the corn harvester indicated in its entirety by reference numeral 5, comprises a main supporting frame 6 supported on a pair of laterally spaced ground wheels 7, and is provided with a suitable forwardly extending hitch frame 9. The corn harvester is drawn by a tractor or other suitable draft means and is provided with the usual forwardly extending gatherers 8 and mechanism for snapping the ears of corn from the stalks, as is well-known to those skilled in the art, and since this part of the implement has nothing to do with the present invention, it will not be described here.

The snapped ears of corn are conveyed rearwardly and upwardly from the snapping mechanism by means of a suitable elevator 10, which discharges the ears rearwardly into a trough or hopper 11. The bottom of the hopper 11 is inclined downwardly and laterally to feed the ears of corn to a set of transversely disposed husking rolls 12 journaled at opposite ends thereof in bearings 13, 14, respectively. The rolls 12 are driven by means of a power shaft 15 which extends rearwardly beneath the hopper 11 and has a bevel gear 16 mounted thereon, which meshes with a cooperative bevel gear 17 fixed to the shaft of one of the husking rolls 12. The two rolls 12 are provided with intermeshing gears 18 by means of which the other roll of the pair is driven by power transmitted through the bevel gear 17. Preferably, the husking mechanism includes a plurality of pairs of husking rolls, as is well-known to those skilled in the art. The driving gears are protected by suitable shields 19 to prevent accidental contact therewith.

The husking rolls 12 are supported on the main corn harvester frame in a superstructure rising above the latter and comprising a number of vertical frame members 25, 26, interconnected by diagonal bracing members 27, and a pair of transversely disposed horizontal frame members 28, 29 defining the upper edge of the husking roll housing, indicated in its entirety by the reference numeral 30. The vertical frame member 25 is extended upwardly above the husking roll housing 30 and is suitably bolted to the inner end of the hopper 11 for supporting the same. The outer end of the hopper 11 is supported by a suitable frame member 31 extending upwardly and outwardly from the lower end of the frame member 25 and is fastened at 32 to the outer end of the hopper 11.

The ear retarder 35 is of any suitable type known to those skilled in the art, but is preferably of the type shown in detail in Patent No. 2,167,967, granted August 1, 1939, to Anderson and Martin, to which reference may be had for a complete disclosure of the details thereof. Briefly, the ear retarder 35 comprises a generally rectangular frame including a pair of side members disposed generally transversely of the corn harvester and spaced apart fore and aft to receive therebetween a pair of laterally spaced rollers or sprockets 37, 38 mounted on shafts 39, 40, respectively. Each of the shafts 39, 40 is journaled at opposite ends thereof in the side frame members 36, and trained over the two rollers 37, 38 is a flexible endless retarder member 41 to which are pivotally connected a plurality of rows of retarder plates 42. The retarder 41 is driven by means of a chain 43 connected to any suitable power driven sprocket and trained over a sprocket 44 on the extended end of the shaft 39 of one of the rollers 37. During operation, the retarder 41 is driven so that the lower run moves in a direction away from the hopper 11 whereby the pivoted plates 42 engage the ears of corn on the husking rolls 12 and urge them toward the opposite ends of the rolls and over a shielding member 45 which covers the journal bearings 14, and into the husked corn elevator 46 which extends upwardly and laterally to deliver the husked corn into a wagon or truck at the side of the implement.

Each of the side members 36 of the ear retarder frame is provided with a lower horizontal flange 50 which is adapted to rest upon the upper frame member 29 of the husking roll housing 30, and thus supports the ear retarder 35 in position above the husking rolls 12.

Disposed above the ear retarder 35 is a cleaning fan 55, which is supported on the ear retarder frame 36 by a pair of vertical frame members 56, suitably fixed at their lower ends to the ends of the side frame members 36, and are interconnected by a pair of vertically spaced frame members 57, 58. A pair of diagonal braces 59 extend from the upper ends of the vertical frame members 56 downwardly and outwardly and are connected to the opposite ends of the side frame members 36 by bolts 60. The fan 55 is suitably supported, as by bolting, on the frame members 56 and braces 59, and the fan rotor 61 includes a shaft 62 which is journaled in bearings 63 fixed to the vertical frame members 56, respectively. The fan 55 has a discharge duct 55' which directs the blast of air outwardly and upwardly through the trough or hopper 11, for blowing dirt, leaves and other trash, which comes into the hopper with the ears of corn from the elevator 10, out through the open outer end of the trough 11.

One end of the ear retarder frame is pivotally supported on a pair of upwardly extending plates 65 attached to the husking roll housing 30 by means of a pair of aligned bolts 66 extending through apertures in each of the plates 65 on the extended lower ends of the diagonal bracing members 59, respectively. The ear retarder frame 36 is fixedly secured to the husking roll housing 30 during normal operation, by means of bolts 67 inserted through aligned apertures 68, 69 in the upper frame members 29 of the housing 30, and the lower flange 50 of the frame 36, respectively.

The fan rotor 61 is driven by a flexible belt 70 trained over a sheave 71 on the fan shaft 62 and a driving sheave 72 fixed to the power shaft 15. The belt is maintained in driving relation with the sheave by means of a suitable adjustable belt tightener 73 which is adjustably fixed to a slotted bracket 74 on the vertical frame member 25.

Thus it is evident that access to the husking rolls 12 is easily and quickly obtained by removing the bolts 67, removing the belt 70 from the sheave 71, and removing the chain 43 from the sprocket 44 after which the ear retarder 35 and fan 55 can be swung as a unit about the axis of the pivot bolt 66 which is generally parallel to the axis of the ear retarder rollers 37, 38. The ear retarder is held in raised position by the diagonal braces 59 engaging a pair of tension rods 80 which are fixed at their lower ends to the vertical frame members 25 and extend outwardly and upwardly to a suitable connection (not shown) with the upper end of the elevator 46.

We claim:

1. In a corn harvester having a frame, husking rolls mounted therein and a delivery trough mounted on said frame for feeding ears to said husking rolls, an ear retarder including a frame disposed above said husking rolls, a cleaning fan mounted on said ear retarder frame adjacent said trough for directing a blast of air through said trough, and means pivotally connecting said retarder frame on said harvester frame providing for swinging said retarder and said fan away from said husking rolls to gain access to the latter.

2. In a corn harvester having a frame, husking rolls mounted therein and a delivery trough mounted on said frame for feeding ears to said husking rolls, an ear retarder comprising a frame, a pair of spaced parallel rollers journaled therein, and a flexible endless member trained over said rollers, a cleaning fan disposed above said flexible member for directing a blast of air through said trough, supporting brackets for said fan mounted on said retarder frame adjacent said trough, and pivot means disposed parallel to said rollers at one end of said retarder frame for connecting the latter to said harvester frame providing for swinging the ear retarder and fan vertically away from said husking rolls.

ELLSWORTH T. JOHNSON.
NORMAN F. ANDREWS.